(12) United States Patent
Read et al.

(10) Patent No.: US 7,870,404 B2
(45) Date of Patent: Jan. 11, 2011

(54) TRANSITIONING TO AND FROM A SLEEP STATE OF A PROCESSOR

(76) Inventors: Andrew Read, 1621 Eagle Dr., Sunnyvale, CA (US) 94087; Sameer Halepete, 373 River Oaks Cir., #1608, San Jose, CA (US) 95134; Keith Klayman, 613 San Conradoter #2, Sunnyvale, CA (US) 94086

( * ) Notice: Subject to any disclaimer, the term of this patent is extended or adjusted under 35 U.S.C. 154(b) by 378 days.

(21) Appl. No.: 11/894,991

(22) Filed: Aug. 21, 2007

(65) Prior Publication Data
US 2007/0294555 A1    Dec. 20, 2007

Related U.S. Application Data

(62) Division of application No. 09/694,433, filed on Oct. 23, 2000, now Pat. No. 7,260,731.

(51) Int. Cl.
*G06F 1/32* (2006.01)
(52) U.S. Cl. ........................ 713/320; 713/323
(58) Field of Classification Search .................. 713/320, 713/323
See application file for complete search history.

(56) References Cited

U.S. PATENT DOCUMENTS

| | | | |
|---|---|---|---|
| 5,086,501 A | | 2/1992 | DeLuca et al. |
| 5,142,684 A | * | 8/1992 | Perry et al. ............... 713/320 |
| 5,167,024 A | | 11/1992 | Smith et al. |
| 5,201,059 A | | 4/1993 | Nguyen |
| 5,204,863 A | * | 4/1993 | Saint-Joigny et al. ......... 714/55 |
| 5,218,704 A | | 6/1993 | Watts, Jr. et al. |
| 5,222,239 A | | 6/1993 | Rosch |
| 5,230,055 A | | 7/1993 | Katz et al. |
| 5,239,652 A | | 8/1993 | Seibert et al. |
| 5,422,806 A | | 6/1995 | Chen et al. |
| 5,440,520 A | * | 8/1995 | Schutz et al. ............... 365/226 |
| 5,461,266 A | | 10/1995 | Koreeda et al. |
| 5,502,838 A | | 3/1996 | Kikinis |
| 5,511,203 A | | 4/1996 | Wisor et al. |
| 5,528,127 A | * | 6/1996 | Streit ......................... 323/269 |
| 5,560,020 A | * | 9/1996 | Nakatani et al. ............ 713/322 |
| 5,572,719 A | | 11/1996 | Biesterfeldt |
| 5,592,173 A | * | 1/1997 | Lau et al. ............... 342/357.12 |
| 5,628,001 A | | 5/1997 | Cepuran |

(Continued)

FOREIGN PATENT DOCUMENTS

EP    0381021    8/1990

(Continued)

OTHER PUBLICATIONS

Madhav P. Desai et al., "Sizing of Clock Distribution Networks for High Performance CPU Chips" Digital Equipment Corporation 1996, pp. 389-394.

(Continued)

*Primary Examiner*—Chun Cao

(57) ABSTRACT

A method for reducing power utilized by a processor including determining that a processor is transitioning from a computer mode to a mode in which system clock to the processor is disabled, and reducing core voltage to the processor to a value sufficient to maintain state during the mode in which system clock is disabled.

21 Claims, 2 Drawing Sheets

U.S. PATENT DOCUMENTS

| | | | |
|---|---|---|---|
| 5,630,110 A | | 5/1997 | Mote, Jr. |
| 5,682,093 A | | 10/1997 | Kivela |
| 5,687,114 A | | 11/1997 | Khan |
| 5,692,204 A | | 11/1997 | Rawson et al. |
| 5,701,783 A | | 12/1997 | Lin |
| 5,710,929 A | | 1/1998 | Fung |
| 5,713,030 A | | 1/1998 | Evoy |
| 5,717,319 A | | 2/1998 | Jokinen |
| 5,719,800 A | | 2/1998 | Mittal et al. |
| 5,726,901 A | | 3/1998 | Brown |
| 5,727,208 A | * | 3/1998 | Brown ........................ 713/100 |
| 5,745,375 A | | 4/1998 | Reinhardt et al. |
| 5,752,011 A | | 5/1998 | Thomas et al. |
| 5,754,869 A | | 5/1998 | Holzhammer et al. |
| 5,757,171 A | * | 5/1998 | Babcock ..................... 323/271 |
| 5,760,636 A | * | 6/1998 | Noble et al. ................. 327/513 |
| 5,774,703 A | | 6/1998 | Weiss et al. |
| 5,778,237 A | * | 7/1998 | Yamamoto et al. .......... 713/322 |
| 5,787,294 A | * | 7/1998 | Evoy .......................... 713/320 |
| 5,812,860 A | | 9/1998 | Horden et al. |
| 5,815,724 A | | 9/1998 | Mates |
| 5,825,674 A | * | 10/1998 | Jackson ....................... 713/321 |
| 5,832,205 A | * | 11/1998 | Kelly et al. ................... 714/53 |
| 5,832,284 A | | 11/1998 | Michail et al. |
| 5,848,281 A | * | 12/1998 | Smalley et al. .............. 713/322 |
| 5,852,737 A | * | 12/1998 | Bikowsky ................... 713/323 |
| 5,884,049 A | * | 3/1999 | Atkinson .................... 710/303 |
| 5,894,577 A | * | 4/1999 | MacDonald et al. ........ 710/260 |
| 5,913,067 A | | 6/1999 | Klein |
| 5,914,996 A | | 6/1999 | Huang |
| 5,919,262 A | * | 7/1999 | Kikinis et al. ............... 713/300 |
| 5,923,545 A | * | 7/1999 | Nguyen ....................... 363/24 |
| 5,933,649 A | * | 8/1999 | Lim et al. ................... 713/322 |
| 5,940,785 A | | 8/1999 | Georgiou et al. |
| 5,940,786 A | | 8/1999 | Steeby |
| 5,974,557 A | | 10/1999 | Thomas et al. |
| 5,996,083 A | | 11/1999 | Gupta et al. |
| 5,996,084 A | | 11/1999 | Watts |
| 6,021,500 A | | 2/2000 | Wang et al. |
| 6,047,248 A | * | 4/2000 | Georgiou et al. ............ 702/132 |
| 6,078,319 A | | 6/2000 | Bril et al. |
| 6,094,367 A | | 7/2000 | Hsu et al. |
| 6,111,806 A | * | 8/2000 | Shirley et al. ............... 365/226 |
| 6,112,164 A | | 8/2000 | Hobson |
| 6,118,306 A | * | 9/2000 | Orton et al. .................. 327/44 |
| 6,119,241 A | | 9/2000 | Michail et al. |
| 6,141,762 A | | 10/2000 | Nicol et al. |
| 6,157,092 A | | 12/2000 | Hofmann |
| 6,202,104 B1 | * | 3/2001 | Ober ............................ 710/18 |
| 6,208,127 B1 | * | 3/2001 | Doluca ........................ 323/349 |
| 6,216,235 B1 | | 4/2001 | Thomas et al. |
| 6,272,642 B2 | * | 8/2001 | Pole et al. .................... 713/300 |
| 6,279,048 B1 | * | 8/2001 | Fadavi-Ardekani et al. ... 710/15 |
| 6,304,824 B1 | * | 10/2001 | Bausch et al. ............... 702/64 |
| 6,311,287 B1 | | 10/2001 | Dischler et al. |
| 6,314,522 B1 | * | 11/2001 | Chu et al. .................... 713/322 |
| 6,345,363 B1 | | 2/2002 | Levy-Kendler |
| 6,347,379 B1 | | 2/2002 | Dai et al. |
| 6,378,081 B1 | | 4/2002 | Hammond |
| 6,388,432 B2 | | 5/2002 | Uchida |
| 6,415,388 B1 | | 7/2002 | Browning et al. |
| 6,425,086 B1 | * | 7/2002 | Clark et al. .................. 713/322 |
| 6,427,211 B2 | | 7/2002 | Watts, Jr. |
| 6,442,746 B1 | * | 8/2002 | James et al. .................. 716/14 |
| 6,457,082 B1 | * | 9/2002 | Zhang et al. ................. 710/260 |
| 6,457,135 B1 | * | 9/2002 | Cooper ........................ 713/323 |
| 6,477,654 B1 | | 11/2002 | Dean et al. |
| 6,484,265 B2 | * | 11/2002 | Borkar et al. ................ 713/324 |
| 6,487,668 B2 | | 11/2002 | Thomas et al. |
| 6,510,400 B1 | | 1/2003 | Moriyama |
| 6,510,525 B1 | | 1/2003 | Nookala et al. |
| 6,513,124 B1 | | 1/2003 | Furuichi et al. |
| 6,519,706 B1 | | 2/2003 | Ogoro |
| 6,574,739 B1 | | 6/2003 | Kung et al. |
| 6,675,304 B1 | * | 1/2004 | Pole et al. .................... 713/322 |
| 6,704,880 B2 | * | 3/2004 | Dai et al. ..................... 713/323 |
| 7,260,731 B1 | * | 8/2007 | Read et al. ................... 713/320 |
| 2002/0026597 A1 | | 2/2002 | Dai et al. |
| 2002/0073348 A1 | | 6/2002 | Tani |
| 2002/0083356 A1 | | 6/2002 | Dai |
| 2002/0087896 A1 | | 7/2002 | Cline et al. |
| 2002/0138778 A1 | | 9/2002 | Cole et al. |
| 2003/0065960 A1 | | 4/2003 | Rusu et al. |
| 2003/0074591 A1 | | 4/2003 | McClendon et al. |

FOREIGN PATENT DOCUMENTS

| | | |
|---|---|---|
| EP | 0474963 | 3/1992 |
| EP | 0501655 | 9/1992 |
| EP | 632360 | 1/1995 |
| EP | 978781 | 2/2000 |
| JP | 409185589 | 7/1997 |
| WO | WO0127728 | 4/2001 |

OTHER PUBLICATIONS

"RE: AX64PRO or AK72?"; Newsreader, Jun. 15, 2000, pp. 1-2.
AMD Athlon; "Processor Module" Datasheet, Jun. 2000; pp. 1-64.
Intel, "Pentium III Processor for the SC242 at 450 Mhz to 866 MHZ and 1.0 GHZ", Datasheet, Mar. 2000, pp. 1-30.
"High-Speed Step-Down Controller With Synchronous Rectification for CPU Power", Maxim, pp. 1-16.
"High-Speed, Digitally Adjusted Step-Down Controllers for Notebook CPUS", Maxim, Jul. 2000, pp. 1-28.
"High-Speed Digitally Adjusted Step-Down Controllers for Notebook CPUS"; MAX1710/MAX1711; Maxim Manual;p. 11 and p. 21.
"Operation U (Refer to Functional Diagram)" LTC1736; Linear Technology Manual p. 9.
Weiser et al; "Scheduling for Reduced CPU Energy"; Xerox PARC, Operating Systems Design and Implementation; USENIX Assoc. Nov. 1994.
Govil; "Comparing Algorithms for Dynamic Speedsetting of a Low Power CPU"; International Computer Science Institute; Berkeley, CA; Apr. 1995.
"VT82C686A 'Super South' South Bridge"; Feb. 25, 2000; Rev. 1.54, VIA Technologies, Inc.
AMD Athlon-Processor Model 4 Data Sheet, No. 23792, Rev. K, Nov. 2001. Advanced Micro Devices, Inc.
"Manual for Kinetiz 7T", 2000; QDI Computer, Inc. (USA).
INTEL Corporation; "INTEL 82801 CAM I/O Controller Hub (ICH3-M)" Datasheet; Jul. 2001.

* cited by examiner

TRANSITIONING TO AND FROM A SLEEP STATE OF A PROCESSOR

RELATED APPLICATION

This application is a Divisional Application of co-pending, commonly owned U.S. patent application Ser. No. 09/694,433, attorney docket TRAN-P059, filed Oct. 23, 2000 now U.S. Pat. No. 7,260,731, entitled "SAVING POWER WHEN IN OR TRANSITIONING TO A STATIC MODE OF A PROCESSOR" to Read et al., which is hereby incorporated herein by reference in its entirety.

BACKGROUND OF THE INVENTION

1. Field of the Invention

This invention relates to computer systems and, more particularly, to apparatus and methods for reducing power use by a computer system during intervals in which processing is stopped.

2. History of the Prior Art

As computer processors have increased in ability, the number of transistors utilized has increased almost exponentially. This increase in circuit elements has drastically increased the power requirements of such processors. As the need of power increases, the temperature at which a computer operates increases and the battery life of portable computers decreases. The loss of battery life with modern portable computers greatly reduces the time during which the computer can function as a portable device. In fact, the power usage has become so great that even with significant reduction in the process size utilized, a plethora of techniques have been implemented to reduce power usage to maintain the efficacy of portable computers.

One of these techniques monitors the use of the various devices within the computer and disables those devices that have not been utilized for some period. Because the processor utilizes a significant amount of the power (e.g., 50%) used by a portable computer, this technique is utilized to disable the processor itself when its processing requirements are unused for some interval. In the typical case, disabling the processor is accomplished by terminating the system clocks furnished to the processor. When processor clocks have been disabled, controlling circuitry (typically a portion of the "Southbridge" circuitry of an X86-processor-based computer) remains enabled to detect interrupts requiring processor operation. The receipt of such an interrupt causes the controlling circuitry to once again enable clocks to the processor so that the processor may take whatever steps are necessary to handle the basis of the interrupt.

The technique of disabling the processor reduces significantly the dissipation of power caused by the operation of the processor even at a low frequency. In fact, the technique works quite well; and it is estimated that with many portable computers the processor is placed in the state in which system clocks are disabled during approximately ninety percent of the operation of the computer. However, use of this technique emphasizes another aspect of power loss using advanced processors. When system clocks for a processor are disabled, the processor must remain in a state (sometimes called "deep sleep") in which it is capable of rapidly responding to interrupts. Such a state requires the application of core voltage to the various circuits. The application of this voltage generates a power dissipation referred to in this specification as "static power" usage because the processor is in its static state in which clocks are disabled. To date there has been little attention paid to this static power usage. However, the usage is very significant when a processor functions in the deep sleep mode as much as ninety percent of the time. As process technologies continue to shrink in dimension and lower operating voltages, this static power increases due to lower threshold voltages and thinner gate oxides.

It is desirable to furnish apparatus and methods for reducing the power use of a processor in the state in which its clocks are disabled.

SUMMARY OF THE INVENTION

The present invention is realized by a method for reducing power utilized by a processor including the steps of determining that a processor is transitioning from a computing mode to a mode in which system clock to the processor is disabled, and reducing core voltage to the processor to a value sufficient to maintain state during the mode in which system clock is disabled.

These and other features of the invention will be better understood by reference to the detailed description which follows taken together with the drawings in which like elements are referred to by like designations throughout the several views.

DETAILED DESCRIPTION

Figure 1:
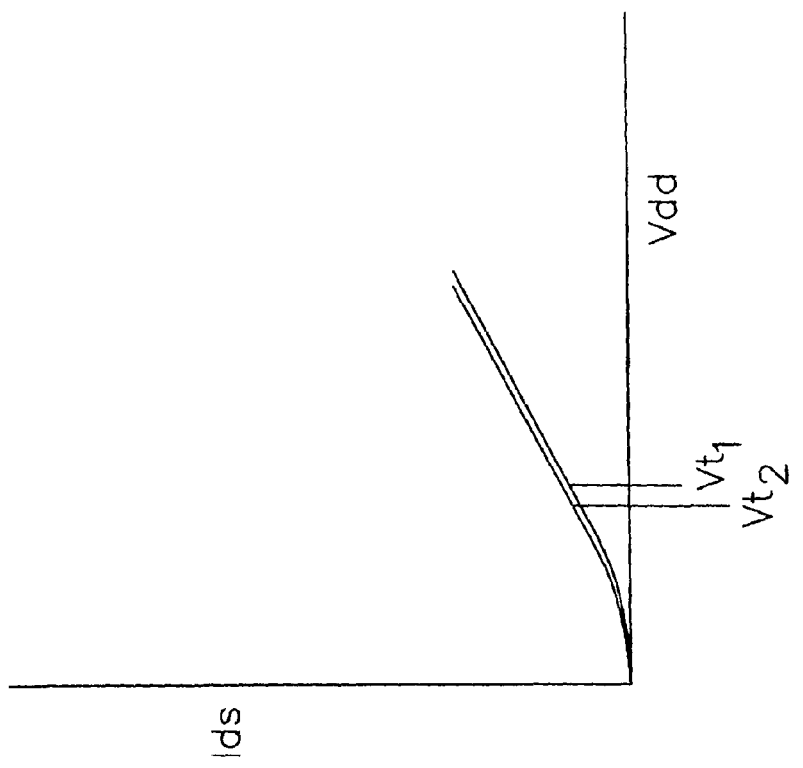
FIG. 1 is a diagram illustrating current-voltage characteristics of CMOS transistor devices utilized in microprocessors.

FIG. 1 is a first diagram displaying a number of curves illustrating the current-voltage characteristics of CMOS transistor devices utilized in the circuits of a microprocessor. This first diagram utilizes a linear scale for both current and voltage. As may be seen, each of the curves illustrates that the drain-to-source current of a transistor is essentially nonexistent until the voltage at the gate terminal of the transistor is raised to a threshold voltage. Once the threshold voltage of the transistor is reached, drain-to-source current increases either linearly or quadratically depending on whether the transistor is in the linear region or saturation region of operation.

Figure 2:
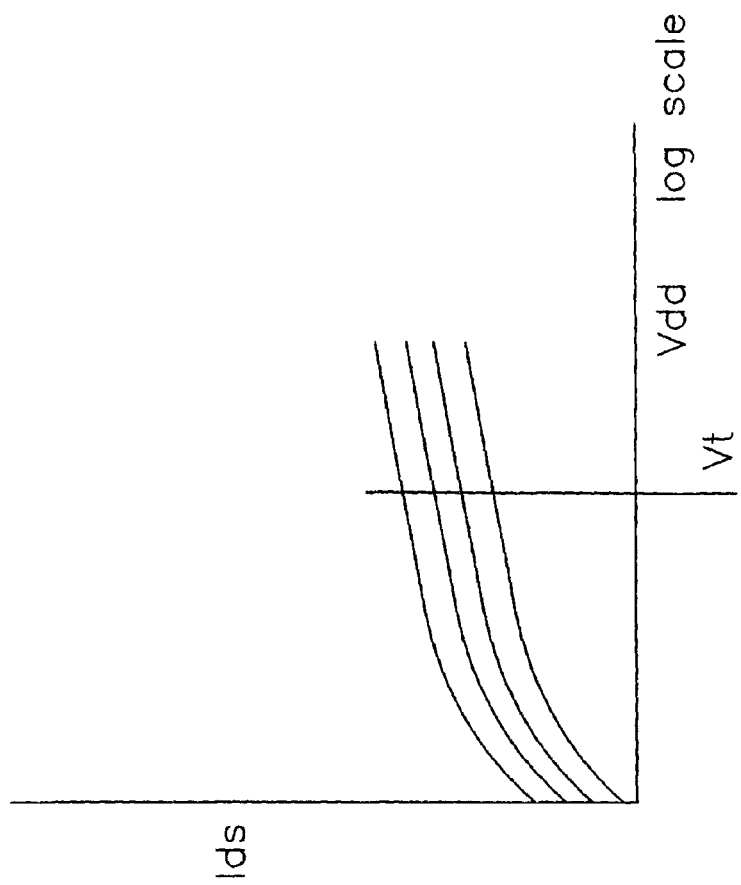
FIG. 2 is another diagram illustrating current-voltage characteristics of CMOS transistor devices utilized in microprocessors.

Although the diagram of FIG. 1 appears to illustrate that current flowing below the threshold value of the gate voltage is insignificant, this is not the case in some situations. FIG. 2 illustrates current versus voltage curves of the typical transistor device below the threshold voltage with the voltage being plotted on a log scale. As may be seen, current in fact flows below the threshold voltage. If a transistor functions in the state below the threshold voltage for ninety percent of computer processor operation, then this current has a significant affect on power usage by the processor.

Since a processor is not capable of computing in the mode in which its clocks are disabled, it would at first glance appear that the solution would be to terminate the application of voltage to the processor. However, as suggested above, it is necessary that the processor be maintained in a condition in which it can respond rapidly to interrupts provided by the circuitry that controls application of the system clocks. To do this, the processor must maintain state sufficient to immediately return to an operating condition. Thus, prior art processors have been provided sufficient voltage to maintain such state and to keep their transistors ready to immediately respond to interrupts. In general, this has been accomplished by maintaining the processor core voltage at the same level as the operating voltage. With most prior art processors, the core voltage used by a processor is selected by use of motherboard switches or setup software at a level sufficient to provide the highest frequency operations specified for the particular processor. For example, many processors provide 1.8 volts as a core voltage. On the other hand, the voltage required to maintain state in a deep sleep mode may be significantly less, e.g., one volt or less. Since such processors function at the same voltage whether in a computing or a deep sleep mode, a significant amount of unnecessary power may be expended. In one typical state of the art X86 processor, the power usage averages approximately one-half watt in the deep sleep state because of the leakage illustrated by the diagram of FIG. 2.

The present invention reduces the voltage applied to the processor significantly below the lowest voltage normally furnished as a core voltage for the processor during the mode in which system clocks are disabled thereby reducing the power utilized by the processor in the deep sleep state.

Figure 3:
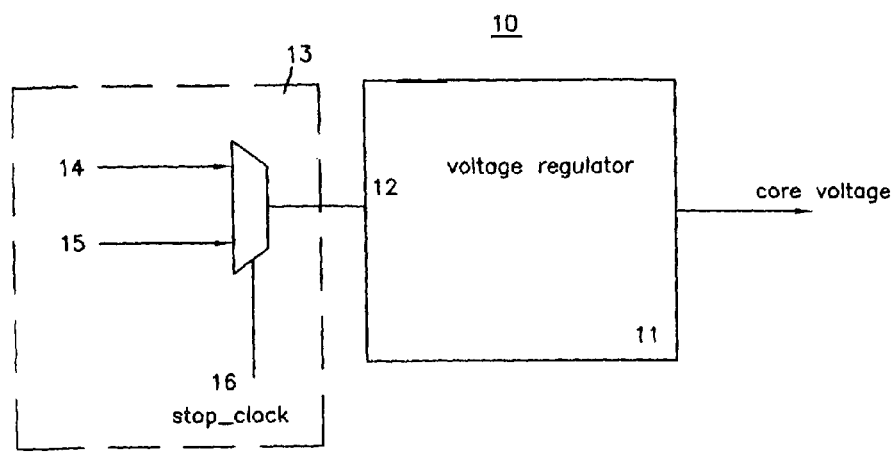
FIG. 3 is a circuit diagram illustrating a first circuit designed in accordance with the present invention for reducing static power usage.

FIG. 3 is a circuit diagram illustrating a first embodiment of the invention. In the circuit 10 illustrated, a switching voltage regulator 11 receives an input signal at a terminal 12 which determines its output voltage value. Most modern processors utilize a voltage regulator which is capable of furnishing a range of core voltages for operating transistors; a typical regulator may furnish a range of voltages between 2 and 0.925 volts from which a particular core voltage may be selected for operation. Typically, a binary signal is provided a the terminal 12 which selects the particular output voltage level to be furnished by the regulator 11; in such a case, a number of individual pins may be utilized as the terminal 12.

Recently, a new power saving technique has been utilized which dynamically adjusts both the voltage and operating frequency to a level sufficient to maintain computing operations being conducted by a processor. The technique which offers significant power savings is described in detail in U.S. patent application Ser. No. 09/484,516, filed Jan. 18, 2000, entitled Adaptive Power Control, assigned to the assignee of the present invention. A processor which utilizes this technique monitors operations within the processor to determine the frequency level at which the processor should operate. Depending on the particular operations being carried out by the processor, the value furnished at the terminal 12 of a regulator functioning in such a system will cause the regulator to produce an output voltage at some level between the high and low values necessary for the particular processor to carry out computing functions.

In the circuit of FIG. 3, input to the terminal 12 is furnished via a circuit 13 such as a multiplexor that is capable of providing one or more input values. In the embodiment illustrated, a value is provided at a first input 14 to the circuit 13 by the processor (or other circuitry) which determines the operating condition of the processor in its computing range; and a second value is provided at a second input 15 which is selected especially for the deep sleep condition. Either of these input values may be selected by a control signal provided at a control terminal 16 of the circuit 13. In one embodiment, a system control signal normally utilized to signal entry into the deep sleep condition (a stop clock signal) is used as the control signal to be furnished at the control terminal 16. This control signal selects the input value furnished at the input 15 which is especially chosen to cause a typical prior art regulator 11 to produce a voltage output for operating the processor in the deep sleep mode. In one embodiment of the invention, the value furnished for deep sleep mode is chosen to cause the regulator 11 to produce the lowest voltage possible in its range of output voltages. In one exemplary processor that utilizes the technique described in the above-mentioned patent application, the processor is specified as capable of conducting computing operations in a core voltage range from a low voltage of 1.2 volts to a high voltage of 1.6 volts. On the other hand, the processor when operating in deep sleep mode has no problem maintaining that state necessary to resume computing even though functioning at a core voltage of 0.925 volts, the lowest voltage which the regulator can provide. Thus, although the voltage regulator 11 may typically provide a range of varying output voltage levels, the lowest voltage at which a processor is specified for conducting computing operations is typically significantly above the lowest value which the regulator is capable of furnishing.

In order to reduce power usage in one embodiment of the present invention, in response to a control signal indicating that the processor is about to go into the deep sleep state, the value at the input 15 is furnished by the circuit 13 to the regulator causing the regulator 11 to generate its lowest possible output voltage level for the deep sleep condition. In one exemplary embodiment, the high and low voltages generated in a computing mode are 1.6 volts and 1.2 volts while the deep sleep voltage is 0.925 volts.

Although the voltage level furnished by the regulator 11 for the deep sleep mode of the processor might appear to be only slightly lower than that furnished in the lowest operating condition for the exemplary processor, the reduction in power usage is quite significant. Because both the voltage and the leakage current are reduced, the reduction in power is approximately equal to the ratio in voltage levels raised to the power of about three to four. Over any period of processor use involving the deep sleep state, such a reduction is quite large.

One problem with this approach to reducing power is that it does not reduce the voltage level as far as might be possible and, thus, does not conserve as much power as could be saved. This approach only reduces the voltage level to the lowest level furnished by the regulator. This voltage is significantly greater than appears to be necessary for a processor which also dynamically regulates voltage furnished during computing operations to save power. Two criteria control the level to which the core voltage may be reduced in deep sleep. The level must be sufficient to maintain state that the processor requires to function after returning from the deep sleep state. The level must be one that can be reached during the times allowed for transition to and from the deep sleep mode.

The first criterion is met so long as values of state stored are not lost during the deep sleep mode. Tests have shown that a core voltage significantly below one-half volt allows the retention of the memory state of a processor. Thus, using this criterion, it would be desirable to reduce the core voltage to a value such as one-half volt or lower.

However, depending on system configuration, the time allowed to transition to and from deep sleep in an X86 processor can be as low as 50 microseconds. Depending on the capacitive load of the particular circuitry, a voltage variation of about 0.5 to 0.6 volts may take place during this time in one exemplary configuration.

Thus, if the exemplary processor is operating at its lowest processing core voltage of 1.2 volts, its core voltage may be lowered in the time available to 0.6-0.7 volts. On the other hand, if the processor is operating at a processing core voltage of 1.5 volts, its core voltage may only be lowered in the time available to 0.9-1 volts. Consequently, it is desirable that the core voltage furnished during deep sleep be lowered to a level which may be below the level provided by a typical voltage regulator but which varies depending on the core operating voltage from which it transitions.

Figure 4:
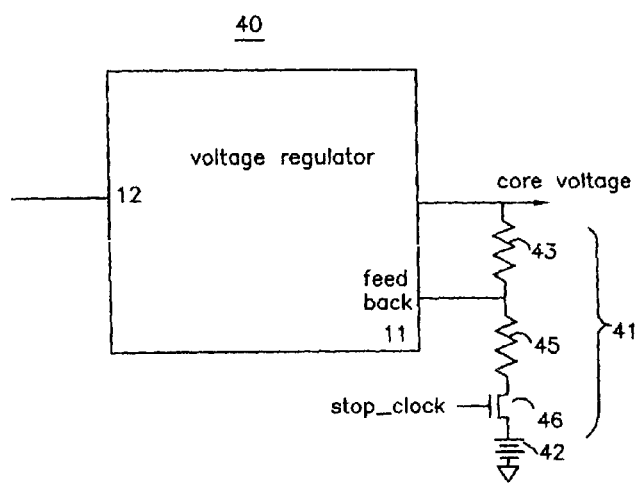
FIG. 4 is a circuit diagram illustrating a second circuit designed in accordance with the present invention for reducing static power usage.

This desirable result may be reached utilizing a circuit such as that described in FIG. 4. The circuit of FIG. 4 includes a feedback network 41 for controlling the level of voltage at the output of the regulator 11. Prior art regulators such as the Maxim 1711 provide a feedback terminal and describe how that terminal may be utilized with a resistor-voltage-divider network joined between the output terminal and ground to raise the output voltage level.

The embodiment of the present invention illustrated in FIG. 4 utilizes the same feedback terminal and a similar resistor-voltage-divider network but joins the divider between the output terminal and a source of voltage 42 higher than the normal output voltage of the regulator to force the output voltage level to a lower value rather than a higher level. The particular source voltage and the particular resistor values may be selected to cause the voltage level at the output of the regulator to drop from a particular output value to a desired value such as 0.6 volts when transitioning from a computing level of 1.2 volts.

By appropriate choice of the resistor values of the divider network 41 and the source 42, the voltage drop provided by such a divider network accomplishes the desired result of providing an output voltage for the deep sleep mode of operation that varies from the previous processor computing core voltage by an amount attainable during the transition period available. In one embodiment, resistor 43 was chosen to be 1 Kohms, resistor 45 to be 2.7 Kohms, and source 42 to be 3.3 volts. Such values cause the voltage drop into deep sleep mode to be between 0.5 and 0.6 volts whether beginning at core voltages of 1.2 or 1.6 volts. On the other hand, by using a higher value of voltage at source 45 and adjusting the values of resistors 41 and 43, the increments of voltage drop reached from different starting voltages to final deep sleep voltage values at the terminal 12 may be brought closer to one another.

It should be noted that the circuitry of FIGS. 3 and 4 may be combined so that both input selection and output adjustment are both used to adjust the core voltage value produced by a voltage regulator for deep sleep mode in particular instances where the load capacitance is relatively low.

Prior art voltage regulators function in at least two different modes of operation. A first mode of operation is often referred to as "low noise" or "continuous" mode. In this mode, the regulator responds as rapidly as possible to each change in voltage thereby maintaining the output voltage at the desired output level as accurately as possible. In order to maintain this mode of rapid response, regulators consume a certain amount of power. When a regulator is supplying a significant amount of power to the load, the power required to operate in continuous mode is relatively small. But, when a regulator is supplying a small amount of power to the load, the power used to operate the regulator in continuous mode becomes significant, and reduces the efficiency of the regulator significantly. It is common for regulators operating in the continuous mode to transfer charge from the supply capacitors back into the power source when the output voltage is changed from a higher voltage to a lower voltage. The regulator can later transfer that charge back to the regulator output capacitors. Thus, most of the charge is not wasted.

A second mode of operation by voltage regulators is often referred to as "high efficiency," "burst," or "skip" mode. In this mode, a regulator detects the reduction in load requirements (such as that caused by a transition into the deep sleep state) and switches to a mode whereby the regulator corrects the output voltage less frequently. When there is an increase in load requirements, the regulator switches back to the continuous mode of regulation during which more rapid correction occurs. This has the positive effect of reducing the power consumed by the regulator during deep sleep thereby increasing the regulator efficiency and saving system power. But, as a result of reducing the regulator response rate, there is more noise on the regulator output.

It is common for regulators operating in the high efficiency mode to drain the charge on the supply capacitors during a high to low voltage transition on the power supply output or to allow the load to drain the charge. Thus, the charge is wasted during high to low voltage transitions.

It is typical to operate a voltage regulator in the high efficiency mode. Consequently, there is some waste of power whenever a regulated processor goes into the lower voltage deep sleep mode. If the processor is constantly being placed in deep sleep mode, then the loss of power may be quite high. Different operating systems may increase the waste of power by their operations. For example, an operating system that detects changes in operation through a polling process must constantly bring a processor out of deep sleep to determine whether a change in operating mode should be implemented. For many such systems, such a system causes an inordinate amount of power waste if a processor would otherwise spend long periods in the deep sleep mode. On the other hand, an operating system that remains in deep sleep until an externally-generated interrupt brings it out of that state wastes power through operating the regulator in the high efficiency mode only when the processor is placed in the deep sleep state.

Figure 5:
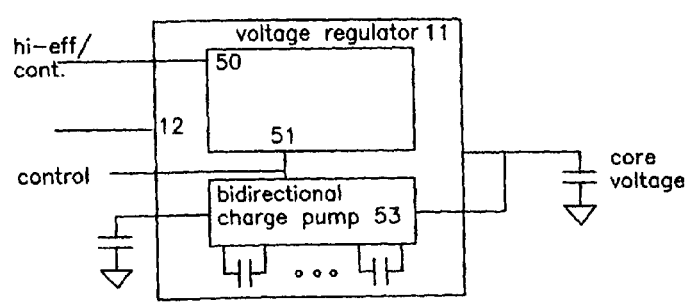
FIG. 5 is another circuit diagram illustrating a circuit designed in accordance with the present invention for reducing static power usage.

The present invention utilizes the ability of regulators to function in both the high efficiency mode and the continuous mode to substantially reduce power wasted by transitioning between a computing and a lower voltage deep sleep mode. Although regulators have not been dynamically switched between high efficiency and continuous modes, in one embodiment of the invention, an additional controlling input 50 as shown in FIG. 5 is added to the regulator for selecting the mode of operation of the regulator based on whether the processor being regulated is transitioning between states. If the regulator receives a control signal 51 indicating that the processor is to be placed into the deep sleep mode, for example, then a regulator operating in the high efficiency mode immediately switches to the continuous mode during the voltage transition. Assuming that the regulator returns the charge to the battery during continuous mode, this has the effect of reducing the waste of power caused during the transition. Once the transition has completed, the regulator switches back to the high efficiency state for operation during the deep sleep mode of the processor.

For regulators that do not conserve capacitive charge by transferring the charge to the battery, a circuit for accomplishing this may be implemented or a capacitor storage arrangement such as a charge pump 53 for storage may be added. Alternatively, when transitioning to deep sleep, the regulator could switch to a mode where the regulator does not actively drive the voltage low but allows the capacitor charge to drain through the load. The selection of power savings modes is dependent on the processor leakage current, the voltage drop between the operating and deep sleep voltages, and the efficiency of the regulator in transferring charge from the capacitors to the power source and then back. If the leakage current is not sufficient to bring the voltage down more than (1-efficiency)*(deep sleep voltage drop) during the deep sleep interval, then it is more advantageous to use the load to drain the charge on the capacitors. Otherwise, the charge on the capacitors should be transferred back to the power source.

The control signal utilized may be the same control signal (stop clocks) that signals the transition into the deep sleep state if the method is to be used only for transitions between operating and deep sleep states. Alternatively, a control signal generated by a particular increment of desired change may be utilized for voltage changes within the computing range of the processor as well as the transition to deep sleep mode.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:
   a processing unit;
   circuitry coupled to the processing unit, said circuitry configured to provide to said processing unit:
   a sleep voltage;
   a first operating voltage; and
   a second operating voltage that is less than the first operating voltage;
   wherein said computer system has a first transition time for transitioning from said sleep voltage to said first operating voltage;
   wherein said computer system has a second transition time for transitioning from said sleep voltage to said second operating voltage;
   wherein said second transition time is within an allowed time for transitioning from a sleep state to an operating state; and
   wherein said first transition time is greater than said allowed time.

2. A computer system as recited in claim 1 wherein said allowed time is based on a configuration of said computer system.

3. A computer system as recited in claim 1 wherein said allowed time is based on timing requirements of said computer system.

4. A computer system as recited in claim 3, wherein said timing requirements are based on interrupt response times.

5. A computer system as recited in claim 1 wherein said first and second transition times are based on respective first and second voltage ramp times.

6. A computer system as recited in claim 1 wherein said sleep voltage is sufficient to maintain state of said processing unit but is not sufficient to maintain processing activity in said processing unit.

7. A method of operating a computer processor, said method comprising:
   transitioning from providing a sleep voltage to said computer processor to providing a first operating voltage to said computer processor within an allowed time for transitioning from a sleep state to an operating state; and
   transitioning from said providing said first operating voltage to said computer processor to providing a second operating voltage to said computer processor, wherein a transition time for changing from said sleep voltage directly to said second operating voltage is greater than said allowed time for transitioning from said sleep state to said operating state.

8. A method in accordance with claim 7 wherein said second operating voltage is greater than said first operating voltage.

9. A method in accordance with claim 7 further comprising:
   enabling a system clock to said computer processor when providing said first operating voltage to said computer processor; and
   disabling said system clock to said computer processor when providing said sleep voltage to said computer processor.

10. A method in accordance with claim 7, wherein said sleep voltage is sufficient to maintain state of said computer processor but is not sufficient to maintain processing activity in said computer processor.

11. A computer system comprising:
    a processor;
    an adjustable voltage supply configured to output to said processor:
    a first and a second sleep voltage;
    a first operating voltage responsive to a transition from said first sleep voltage: and
    a second operating voltage responsive to a transition from said second sleep voltage,
    wherein said adjustable voltage supply is configured to generate a voltage transition from said second sleep voltage to said first operating voltage in a time period greater than a time period allowed for transition from a sleep state to an operating state of said computer system.

12. A computer system as recited in claim 11, wherein said adjustable voltage supply is further configured to output to said processor a second operating voltage that, based on a rate of transitioning from said sleep voltage to said second operating voltage, is achievable from said sleep voltage within said allowed time for transitioning from said sleep state to said operating state.

13. A computer system as recited in claim 11 wherein said allowed time is based on a configuration of said computer system.

14. A computer system as recited in claim 11 wherein said adjustable voltage supply comprises a voltage regulator.

15. A computer system comprising:
    a processing unit;
    circuitry coupled to the processing unit, said circuitry configured to provide to said processing unit:
    a first sleep voltage and a second sleep voltage;
    a first operating voltage when transitioning from said first sleep voltage;
    a second operating voltage when transitioning from said second sleep voltage,
    wherein said first operating voltage is greater than said second operating voltage and wherein said first sleep voltage is greater than said second sleep voltage: and
    wherein a voltage transition from said second sleep voltage to said first operating voltage is greater than a time allowed for transition from a sleep state to an operating state of said computer system.

16. A computer system as recited in claim 15, wherein said circuitry is further configured to provide to said processing unit:

said first sleep voltage when transitioning from said first operating voltage; and said second sleep voltage when transitioning from said second operating voltage.

17. A computer system as recited in claim 15 wherein a voltage difference between said first operating voltage and said first sleep voltage is approximately equal to a voltage difference between said second operating voltage and said second sleep voltage.

18. A computer system comprising:
   means for processing;
   means for supplying a voltage coupled to said processing means for providing to said processing means:
      a first and a second sleep voltage;
      a first operating voltage responsive to a transition from said first sleep voltage; and
      a second operating voltage responsive to a transition from said second sleep voltage,
   wherein said means for supplying a voltage comprises means to generate a voltage transition from said second sleep voltage to said first operating voltage in a time period greater than a time period allowed for transition from a sleep state to an operating state of said computer system.

19. The computer system of claim 18 wherein:
   said means for supplying a voltage are further for providing to said means for processing:
      said first sleep voltage re responsive to a transition from said first operating voltage; and
      said second sleep voltage responsive to a transition from said second operating voltage.

20. The computer system of claim 18 wherein a voltage difference between said first operating voltage and said first sleep voltage is approximately equal to a voltage difference between said second operating voltage and said second sleep voltage.

21. The computer system of claim 18 wherein said first operating voltage is greater than said second operating voltage and wherein said first sleep voltage is greater than said second sleep voltage.

* * * * *

UNITED STATES PATENT AND TRADEMARK OFFICE
CERTIFICATE OF CORRECTION

PATENT NO.        : 7,870,404 B2                                              Page 1 of 1
APPLICATION NO.   : 11/894991
DATED             : January 11, 2011
INVENTOR(S)       : Read et al.

It is certified that error appears in the above-identified patent and that said Letters Patent is hereby corrected as shown below:

Page 2, item (56), under "Other Publications", in Column 2, Line 3, delete "Mhz" and insert -- MHZ --.

Column 8, line 27, in Claim 11, delete "voltage:" and insert -- voltage; --.

Column 8, line 60, in Claim 15, delete "voltage:" and insert -- voltage; --.

Column 10, line 7, in Claim 19, delete "re responsive" and insert -- responsive --.

Signed and Sealed this
Thirty-first Day of May, 2011

David J. Kappos
*Director of the United States Patent and Trademark Office*